(12) United States Patent
Olson

(10) Patent No.: US 12,049,416 B2
(45) Date of Patent: Jul. 30, 2024

(54) SIMULTANEOUS NITRIFICATION/DENITRIFICATION (SNDN) IN SEQUENCING BATCH REACTOR APPLICATIONS

(71) Applicant: Evoqua Water Technologies LLC, Pittsburgh, PA (US)

(72) Inventor: Brandon Martin Olson, Milwaukee, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 18/382,085

(22) Filed: Oct. 20, 2023

(65) Prior Publication Data

US 2024/0059594 A1    Feb. 22, 2024

Related U.S. Application Data

(62) Division of application No. 18/109,263, filed on Feb. 14, 2023, now Pat. No. 11,827,550, which is a
(Continued)

(51) Int. Cl.
*C02F 3/12*    (2023.01)
*C02F 3/00*    (2023.01)
*C02F 3/30*    (2023.01)

(52) U.S. Cl.
CPC ............ *C02F 3/1263* (2013.01); *C02F 3/006* (2013.01); *C02F 3/301* (2013.01); *C02F 3/302* (2013.01);
(Continued)

(58) Field of Classification Search
CPC ........ C02F 3/1263; C02F 3/006; C02F 3/301; C02F 3/302; C02F 2209/006;
(Continued)

(56) References Cited

U.S. PATENT DOCUMENTS 5,266,200 A    11/1993    Reid
6,398,957 B1    6/2002    Mandt
(Continued)

FOREIGN PATENT DOCUMENTS

TW    I359794 B    3/2012
TW    I445673 B    7/2014
(Continued)

OTHER PUBLICATIONS

Ken Anderson, . . . Sinan Uyallilk, in Handbook of Water and Wastewater Microbiology, 2003 (Year: 2003).*
(Continued)

*Primary Examiner* — Ekandra S. Miller-Cruz

(57) ABSTRACT

A method of operating a sequencing batch reactor process includes introducing wastewater to be treated into the sequencing batch reactor and subjecting the wastewater to treatment in the sequencing batch reactor in an aerated anoxic mode in in which a quantity of oxygen is supplied at a level insufficient to meet a biological oxygen demand of the wastewater, but sufficient to cause simultaneous nitrification and denitrification reactions to occur in the wastewater.

14 Claims, 6 Drawing Sheets

Related U.S. Application Data division of application No. 16/646,684, filed as application No. PCT/US2018/050978 on Sep. 14, 2018, now Pat. No. 11,577,978.

(60) Provisional application No. 62/558,570, filed on Sep. 14, 2017.

(52) U.S. Cl.
CPC .. *C02F 2209/006* (2013.01); *C02F 2209/008* (2013.01); *C02F 2209/04* (2013.01); *C02F 2209/22* (2013.01); *C02F 2209/44* (2013.01)

(58) Field of Classification Search
CPC ............ C02F 2209/008; C02F 2209/04; C02F 2209/22; C02F 2209/44; C02F 2209/16; C02F 3/208; C02F 2209/15; Y02W 10/10
USPC ........................................................ 210/614
See application file for complete search history.

(56) References Cited

U.S. PATENT DOCUMENTS

| | | | |
|---|---|---|---|
| 7,172,699 | B1 | 2/2007 | Trivedi et al. |
| 7,335,305 | B2 | 2/2008 | Cheuk et al. |
| 2003/0042199 | A1 | 3/2003 | Smith |
| 2007/0075017 | A1 | 4/2007 | Kuzma |
| 2007/0119763 | A1 | 5/2007 | Probst |
| 2007/0235385 | A1 | 10/2007 | Barnes |
| 2012/0085704 | A1 | 4/2012 | Jenkins et al. |
| 2014/0069864 | A1 | 3/2014 | Wett et al. |
| 2015/0001094 | A1 | 1/2015 | Ibeid et al. |

FOREIGN PATENT DOCUMENTS

| | | |
|---|---|---|
| WO | 2008046139 A1 | 4/2008 |
| WO | 2011103286 A2 | 8/2011 |

OTHER PUBLICATIONS

R. Borja, in Comprehensive Biotechnology (Second Edition), 2011 (Year: 2011).*

Dias-Abey, Asoka, "Examination report No. 1 for standard patent application", Australian Patent Application No. 2018331439, mailed Jul. 19, 2023, 3 pages.

International Search Report for corresponding PCT/US2018/050978, dated Dec. 18, 2018.

Unknown, "Examination Report," Taiwanese Patent Application No. 107132387, mailed Nov. 13, 2020, 5 pages.

Unknown, "Communication pursuant to Rules 70(2) and 70a(2) EPC", European Patent Application No. 18857073.3 mailed May 28, 2021, 1 page.

Rozanska, Agnieska, "Extended European Search Report", European Patent Application No. 18857073.0, mailed May 10, 2021, 10 pages.

Holakoo et al.: "Long term performance of MBR for biological nitrogen removal from synthetic municipal wastewater", Chemosphere, Pergamon Press, vol. 66, No. 5, Nov. 26, 2006, pp. 849-857.

Xinmin Zhan et al.: "Nitrogen removal from slaughterhouse wastewater in a sequencing batch reactor under controlled low DO conditions," Bioprocesses and Biosystems Engineering, Springer, vol. 32, No. 5, 14, Dec. 28, 2008, pp. 607-614.

Ma Weiwei et al: "Enhanced nitrogen removal from coal gasification wastewater by simultaneous nitrification and dentrification (SND) in an oxygen-limited aeration sequencing batch biofilm reactor," Bioresource Technology, vol. 244, Jul. 25, 2017 (Jul. 25, 2017), pp. 84-91.

NPL SBR Technology Anderson.pdf (Year: 2003).

NPL SBR Technology Borja.pdf (Year: 2011).

Patel, Rajesh, "Examination report under sections 12 & 13 of the Patents Act, 1970 and the Patents Rules, 2003", Indian Patent Application No. 202017015279, mailed Oct. 5, 2021, 7 pages.

Unkown, "Examination Report", Taiwanese Patent Application No. 107132387, mailed Jul. 27, 2020, 13 pages.

* cited by examiner

SIMULTANEOUS NITRIFICATION/DENITRIFICATION (SNDN) IN SEQUENCING BATCH REACTOR APPLICATIONS

RELATED APPLICATIONS

This application claims priority under 35 U.S.C. § 119(e) to U.S. Provisional Application Ser. No. 62/558,570 titled "SIMULTANEOUS NITRIFICATION/DENITRIFICATION (SNDN) IN SEQUENCING BATCH REACTOR APPLICATIONS", filed on Sep. 14, 2017, which is herein incorporated by reference in its entirety.

BACKGROUND

1. Field of Disclosure

Aspects and embodiments of the present invention are generally directed to wastewater treatment, and more specifically to the treatment of wastewater in sequencing batch reactors.

2. Discussion of Related Art

Methods for treating wastewater generated from industrial and municipal sources include biological, physical, and/or chemical processes. For instance, biological treatment of wastewater may include aerobic, anoxic, and/or anaerobic treatment units to reduce the total organic content and/or biochemical oxygen demand of the wastewater and nutrients such as nitrogen and phosphorus. Wastewater treatment may be performed as a continuous process or in batch mode. One form of batch mode of wastewater treatment utilizes a sequencing batch reactor.

SUMMARY

In accordance with an aspect, there is provided a method of operating a sequencing batch reactor process. The method comprises introducing wastewater to be treated into the sequencing batch reactor, and subjecting the wastewater to treatment in the sequencing batch reactor in an aerated anoxic mode in which a concentration of dissolved oxygen in the liquid is maintained, or a quantity of oxygen or air is supplied, at a level insufficient to completely meet a biological oxygen demand of the wastewater, but sufficient to cause simultaneous nitrification and denitrification reactions to occur in the wastewater.

In some embodiments, the method further comprises operating the sequencing batch reactor in a plurality of treatment regimes within a single operation cycle, each of the plurality of treatment regimes being characterized by a different concentration of dissolved oxygen in the wastewater.

In some embodiments, the sequencing batch reactor is operated in a first treatment regime with the concentration of dissolved oxygen in the liquid at a first level, operated in a second treatment regime with the concentration of dissolved oxygen in the liquid at second level higher than the first level performed immediately following operation in the first treatment regime, and operated in a third treatment regime with the concentration of dissolved oxygen in the liquid at third level higher than the second level performed immediately following operation in the second treatment regime.

In some embodiments, the sequencing batch reactor is operated in the first treatment regime for a first amount of time, in the second treatment regime for a second amount of time less than the first amount of time, and in the third treatment regime for a third period of time less than the second period of time.

In some embodiments, operating the sequencing batch reactor in the first treatment regime and operating the sequencing batch reactor in the second treatment regime each include maintaining the concentration of dissolved oxygen in the wastewater at a level sufficient to provide for simultaneous nitrification and denitrification to occur in the wastewater.

In some embodiments, operating the sequencing batch reactor in the third treatment regime includes maintaining the concentration of dissolved oxygen in the wastewater at a level greater than a concentration at which denitrification occurs in the wastewater.

In some embodiments, the method further comprises measuring the concentration of dissolved oxygen in the wastewater, and maintaining the concentration of dissolved oxygen in the wastewater at single predetermined setpoints in each of the respective plurality of treatment regimes.

In some embodiments, the concentration of dissolved oxygen in the wastewater is maintained at or below an average of 2 mg/L throughout operation in each of the first, second, and third treatment regimes.

In some embodiments, the concentration of dissolved oxygen in the wastewater is maintained at or below an average of between 0.5 mg/L and 0.8 mg/L throughout operation in the second treatment regime.

In some embodiments, the concentration of dissolved oxygen in the wastewater is maintained at or below an average of between 0.2 mg/L and 0.4 mg/L throughout operation in the first treatment regime.

In some embodiments, maintaining the concentration of dissolved oxygen in the liquid at the predetermined setpoints includes modulating flow of an oxygen-containing gas into the wastewater in response to results of comparisons between measured dissolved oxygen concentrations of the wastewater and the predetermined setpoints.

In some embodiments, the method further comprises performing a settling operation, a decant operation, and an idle operation in the sequencing batch reactor immediately following operating in the third treatment regime.

In some embodiments, the sequencing batch reactor is operated in the first treatment regime during filling of the sequencing batch reactor.

In accordance with another aspect, there is provided a wastewater treatment system. The wastewater treatment system comprises a sequencing batch reactor vessel for receiving a wastewater for treatment, a sensor configured to measure a concentration of dissolved oxygen in the wastewater, an aeration system configured to deliver an oxygen-containing gas into the wastewater, and a controller configured to subject the wastewater to treatment in the sequencing batch reactor vessel in an aerated anoxic mode in which a concentration of dissolved oxygen in the wastewater is maintained at a level insufficient to meet a biological oxygen demand of the wastewater, but sufficient to cause simultaneous nitrification and denitrification reactions to occur in the wastewater.

In some embodiments, the controller is further configured to cause the sequencing batch reactor to operate in a first treatment regime with the concentration of dissolved oxygen in the liquid at a first level, to operate in a second treatment regime with the concentration of dissolved oxygen in the liquid at second level higher than the first level immediately following operation in the first treatment regime, and to operate in a third treatment regime with the concentration of dissolved oxygen in the liquid at third level higher than the second level immediately following operation in the second treatment regime.

In some embodiments, the controller is further configured to cause the sequencing batch reactor to operate in the first treatment regime for a first amount of time, in the second treatment regime for a second amount of time less than the first amount of time, and in the third treatment regime for a third period of time less than the second period of time.

In some embodiments, the controller is further configured to control the aeration system to maintain the concentration of dissolved oxygen in the wastewater at a level sufficient to provide for simultaneous nitrification and denitrification to occur in the liquid during operation in each of the first treatment regime and the second treatment regime.

In some embodiments, the controller is further configured to control the aeration system to maintain the concentration of dissolved oxygen in the wastewater at a level greater than a concentration at which denitrification occurs in the wastewater.

In some embodiments, the controller is further configured to operate the aeration system to maintain the concentration of dissolved oxygen in the wastewater at single predetermined setpoints during operation in each of the first, second, and third treatment regimes.

In accordance with another aspect, there is provided a method of retrofitting a sequencing batch reactor. The method comprises programming a controller of the sequencing batch reactor to operate the sequencing batch reactor in an aerated anoxic mode in which a concentration of dissolved oxygen in wastewater in the sequencing batch reactor is maintained at a level insufficient to meet a biological oxygen demand of the wastewater, but sufficient to cause simultaneous nitrification and denitrification reactions to occur in the wastewater.

In some embodiments, the method further comprises modifying an aeration system of the sequencing batch reactor to supply a non-binary, variable flow of oxygen-containing gas to the wastewater.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
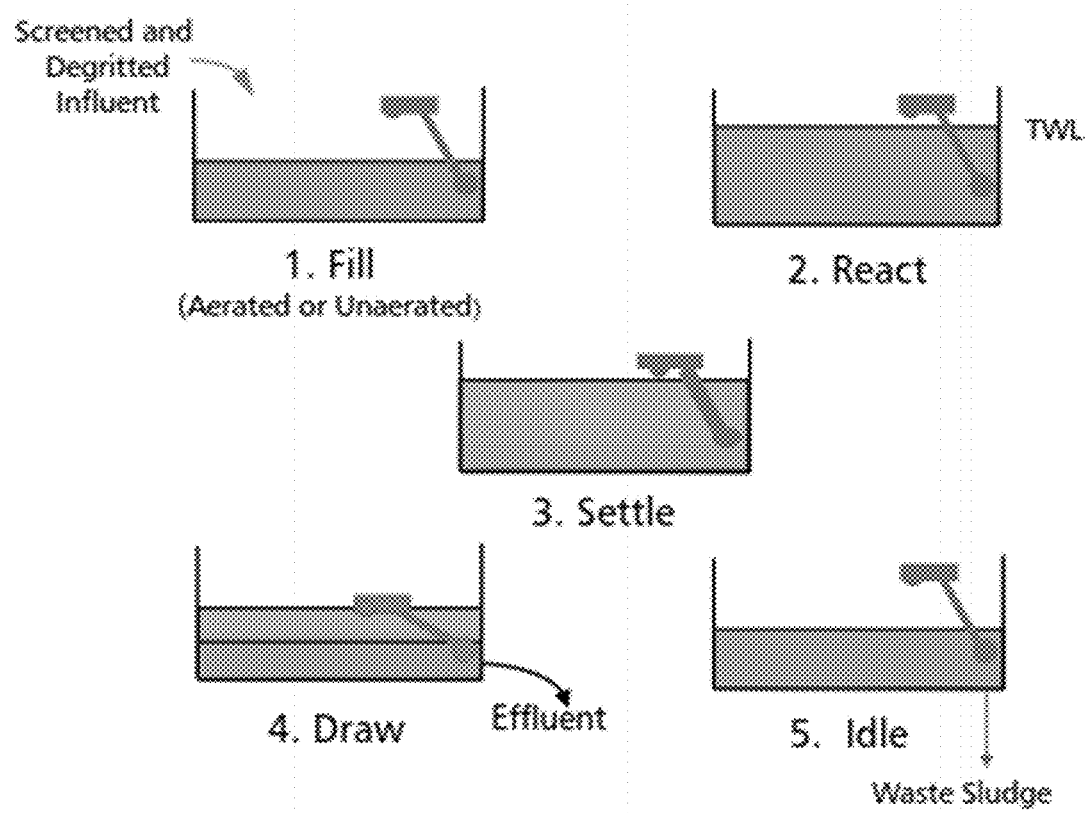
FIG. 1 illustrates steps typically performed in a conventional sequencing batch reactor.

Wastewater treatment systems use various processes for treating wastewater generated from municipal and industrial sources. Wastewater treatment typically includes three general phases. The first phase, or primary treatment, involves mechanically separating dense solids from less dense solids and liquids in the wastewater. Primary treatment is typically performed in sedimentation tanks using gravity separation. The second phase, or secondary treatment, involves biological conversion of ammonia and carbonaceous and nutrient material in the wastewater to more environmentally friendly forms. Secondary treatment is typically performed by promoting the consumption of the ammonia and carbonaceous and nutrient material by bacteria and other types of beneficial organisms already present in the wastewater or that are mixed into the wastewater. The third phase, or tertiary treatment, involves removing the remaining pollutant material from the wastewater. Tertiary treatment is typically performed by filtration or sedimentation with the optional addition of chemicals, UV light, and/or ozone to neutralize harmful organisms and remove any remaining pollutant material.

Secondary treatment of wastewater may be performed in a continuous flow process or in a batch process, for example, in a sequencing batch reactor. Sequencing batch reactors (SBR) or sequential batch reactors are a type of activated sludge process for the treatment of wastewater. A SBR performs a type of activated sludge process for the treatment of water/wastewater in a single basin or vessel. SBRs are flexible in the sense that they can handle a wide range of wastewater flows (for example, 25,000 gpd-100 MGD). SBR reactors treat wastewater such as sewage or output from anaerobic digesters or mechanical biological treatment facilities in batches. Oxygen is bubbled through the mixture of wastewater and activated sludge to reduce the organic matter (measured as biochemical oxygen demand (BOD) and chemical oxygen demand (COD)). The treated effluent may be suitable for discharge to surface waters or possibly for use on land.

While there are several configurations of SBRs, the basic process is similar across the different configurations. The SBR installation includes one or more tanks that can be operated as plug flow or completely mixed reactors. The tanks have a "flow through" system, with raw wastewater (influent) coming in at one end and treated water (effluent) flowing out the other. In systems with multiple tanks, while one tank is in settle/decant mode another may be aerating and filling. In some systems, tanks contain a section known as the bio-selector, which consists of a series of walls or baffles which direct the flow either from side to side of the tank or under and over consecutive baffles. This helps to mix the incoming influent and the returned activated sludge (RAS), beginning the biological digestion process before the liquor enters the main part of the tank.

There are five stages in the treatment process:
1. Fill
2. React
3. Settle
4. Decant or Draw
5. Idle In the Fill stage, an inlet valve of the SBR tank opens and the tank is filled with wastewater to be treated while mixing is provided by mechanical means (no air). This stage is also called the anoxic fill stage. The anoxic fill stage may be followed by an aerobic fill stage.

Aeration of the mixed liquor is performed during the second stage (the React stage) by the use of fixed or floating mechanical pumps or by transferring air into fine bubble diffusers fixed to the floor of the tank. Aeration times vary according to the plant size and the composition/quantity of the incoming liquor, but are typically 60 to 90 minutes. The addition of oxygen to the liquor encourages the multiplication of aerobic bacteria and they consume the nutrients. This process encourages the conversion of nitrogen from its reduced ammonia form to oxidized nitrite and nitrate forms, a process known as nitrification.

To remove phosphorus compounds from the liquor, aluminum sulfate (alum) is often added during this period. It reacts to form non-soluble compounds, which settle into the sludge in the next stage.

No aeration or mixing is provided in the third stage (the Settle stage) and the settling of suspended solids starts. The settling stage is usually the same length in time as the aeration stage. During the settling stage the sludge formed by the bacteria is allowed to settle to the bottom of the tank. The aerobic bacteria continue to multiply until the dissolved oxygen is all but used up. Conditions in the tank, especially near the bottom are now more suitable for the anaerobic bacteria to flourish. Many of these, and some of the bacteria which would prefer an oxygen environment, now start to use oxidized nitrogen instead of oxygen gas (as an alternate terminal electron acceptor) and convert the nitrogen to a gaseous state, as nitrogen oxides or, ideally, molecular nitrogen (dinitrogen, $N_2$) gas. This is known as denitrification. The sludge is allowed to settle until clear water is on the top 20 to 30 percent of the tank contents.

During the fourth stage (the Decant stage) an outlet valve of the SBR tank opens and the "clean" supernatant liquor exits the tank. The decanting stage most commonly involves the slow lowering of a scoop or "trough" into the basin. The scoop or trough may have a piped connection to a lagoon where the final effluent is stored for disposal or to discharge if the effluent requirements are met.

As the bacteria multiply and die, the sludge within the tank increases over time and a waste activated sludge (WAS) pump removes some of the sludge during the settle or idle stage to a digester for further treatment. The quantity or "age" of sludge within the tank is closely monitored, as this can have a marked effect on the treatment process.

While these systems vary in nature, the typical SBR process will be time or flow based. Conventionally, each of the Fill, React, Settle, Draw, and Idle steps is done independently of each other. These steps are outlined in FIG. 1.

Figure 2:
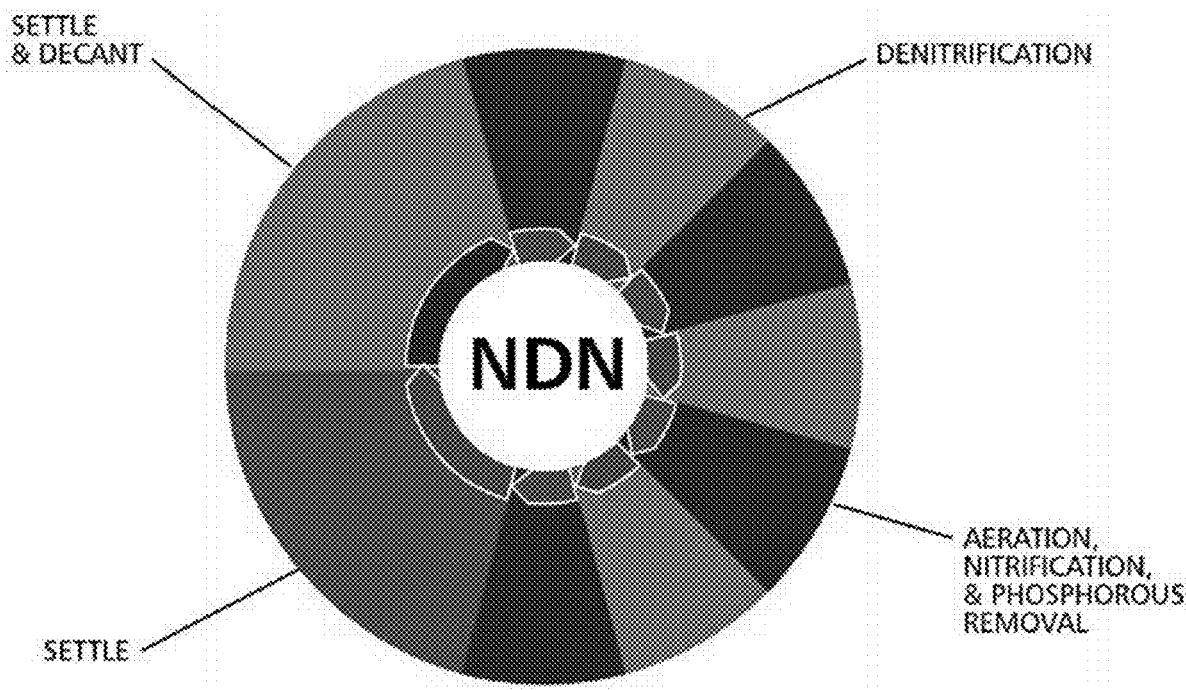
FIG. 2 illustrates forms of treatment performed in different steps in a conventional sequencing batch reactor.

As illustrated in FIG. 2, a traditional SBR uses distinct air on/off periods to achieve biological total nitrogen (TN) and phosphate (P) removal. During times of air on (nitrification) the dissolved oxygen (DO) set point is ~2 mg/L and while the air is off (denitrification) the DO is ~0 mg/L. This requires the blowers which provide aeration to control the amount of DO in the process to ramp up and down numerous times over the course of a single day which can be costly from an operations standpoint. Further, to achieve a DO concentration of 2 mg/l requires a greater air flow rate due to the reduction in transfer efficiency as the DO increases.

There are currently 3,500+ sequencing batch reactors (SBR's) worldwide used to treat both municipal and industrial water/wastewater applications.

With the market for SBRs growing exponentially year over year, improvements in SBR technology can have positive economic effects for companies designing and selling SBR equipment and controls. In one embodiment, an improved SBR comprising a simultaneous nitrification denitrification (SNDN) biological process is utilized which can lower energy consumption which will result in an energy efficient process.

SNDN, in simple terms, is when an oxygen deficit condition is generated in a system with active nitrifiers and where less oxygen than the demand requires is provided. Typically, this is between 60-75% of the oxygen demand within a given treatment system. Providing oxygen at a rate lower than the biological oxygen demand results in low dissolved oxygen (DO) operation due to rapid consumption of available oxygen. In a system that has active nitrifying microorganisms, during SNDN, ammonia is oxidized but since DO is low and dissolved carbon is still plentiful, the nitrates formed are quickly reduced to nitrogen gas by denitrifying organisms.

Figure 3:
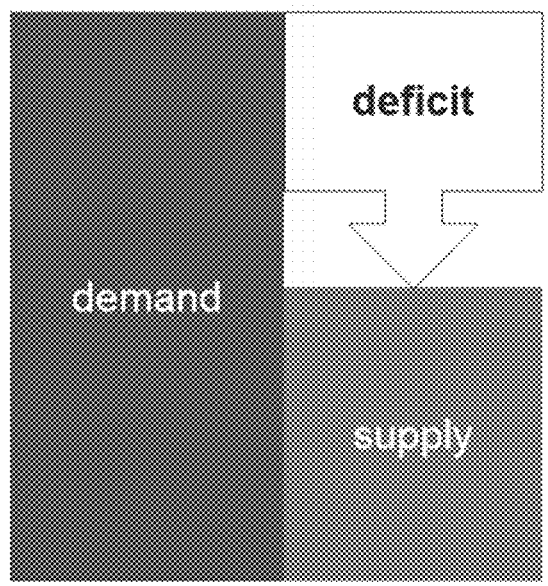
FIG. 3 illustrates the concept of operating a wastewater treatment system an at an oxygen deficit suitable for performing simultaneous nitrification/denitrification.

By utilizing a SNDN biological process, in a SBR application, it is possible to achieve both nitrification and denitrification at the same time while running at a DO of ~0 mg/L or ORP of ~−150 mV. FIG. 3 illustrates the concept of operating an SBR at an oxygen deficit, where chemical or biological oxygen demand is less than oxygen supply, suitable for performing SNDN.

The importance of SNDN in a SBR is that it is possible to skip the independent steps, as shown in FIG. 2, which is customary to the SBR process. By doing so, the same effluent requirements can be achieved, but at a much lower DO which equates to less energy costs to run the treatment system. The only time that the process is operated at a DO above that at which SNDN occurs is near the end of the react stage to achieve final nitrification of any residual ammonia in a polishing fashion.

An SBR operating with SNDN modes of operation may operate with a first aerated anoxic step having a target dissolved oxygen level of between 0.2 mg/L and 0.4 mg/L, for example, 0.3 mg/L that is performed while the SBR is filling, for example, for the first 2.25 hours of a 3 hour fill step. A second aerated anoxic step immediately following the first aerated anoxic fill step may be performed with a target DO level of from 0.4 mg/L to 0.8 mg/L, for example 0.6 mg/L that is performed for the remaining 0.75 hours of the fill step and 0.75 hours of the react step, for a total of 1.5 hours. A third aerated anoxic step immediately following the second aerated anoxic fill step may be performed with a target DO level of about 2 mg/L, for example, from 1.8 mg/L to 2.2 mg/L that is performed for the remaining 0.75 hours of the react step. Immediately following the third aerated anoxic step, a settle step may be performed for about 0.75 hours in which no aeration is performed, followed immediately by a 0.5 hour decant step, followed immediately by a 0.25 hour idle/wasting step. A single operation cycle of the SBR may consist of the combination of the first, second, and third aerated anoxic steps, the settle step, the decant step, and the idle/wasting step.

In some embodiments an SBR performing the SNDN process may be combined with SmartBNR™ controls system (Evoqua Water Technologies LLC, Pittsburgh, PA). In some embodiments, control of DO in an SBR is not achieved based on direct measurement of DO in the liquid in the SBR. Precise control of DO at low DO levels may be difficult to achieve by direct measurement of DO, and so a control system using ORP or specific ion concentrations (ammonia and/or nitrate) may be used.

One important device used in SBRs are diffusers for aeration. One embodiment of a type of diffuser which may be utilized in SRBs as disclosed herein is the Diamond™ S Plus Edition membrane diffuser (Evoqua Water Technologies LLC, Pittsburgh, PA). Aspects and embodiments disclosed herein are not limited by the type of diffuser used to provide an oxygen-containing gas such as air to the SBR system.

Figure 4:
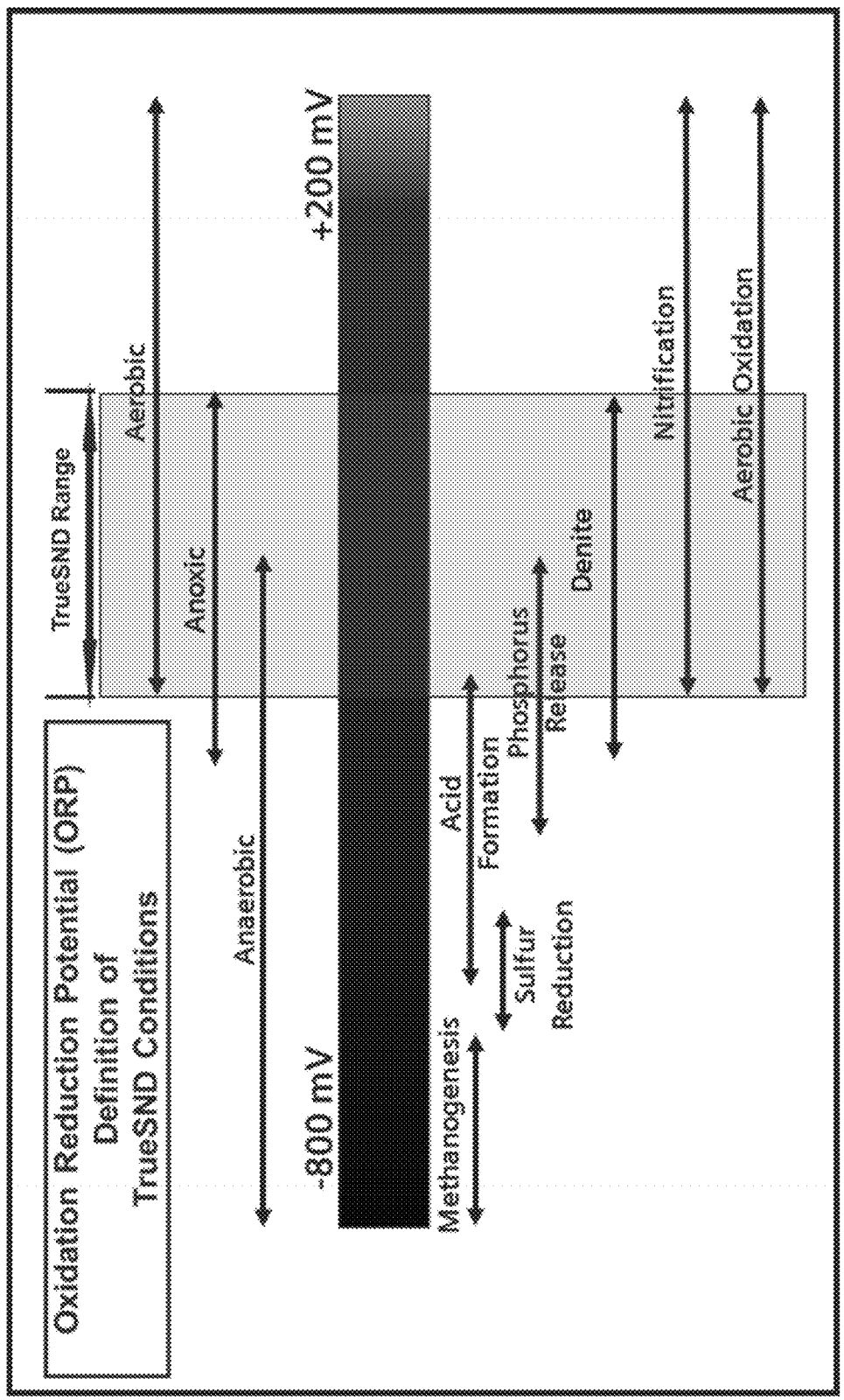
FIG. 4 illustrates typical ORP values used in wastewater treatment.

To control the SNDN system it is possible to use an oxidation reduction potential (ORP) measurement. ORP is controlled by aeration which will change the DO in the wastewater. FIG. 4 illustrates typical ORP values used in wastewater treatment. It is also possible to control the SNDN process by measuring the nitrate and/or ammonia concentration in the wastewater. It is also possible to measure and control DO utilizing a dissolved oxygen sensor.

Advantages of operating a SBR with a SNDN process as disclosed herein include energy savings due to eliminating steps normally required in a SBR process and a biological process that is less complicated than conventional process performed in SBRs since fewer steps are involved.

Figure 5:
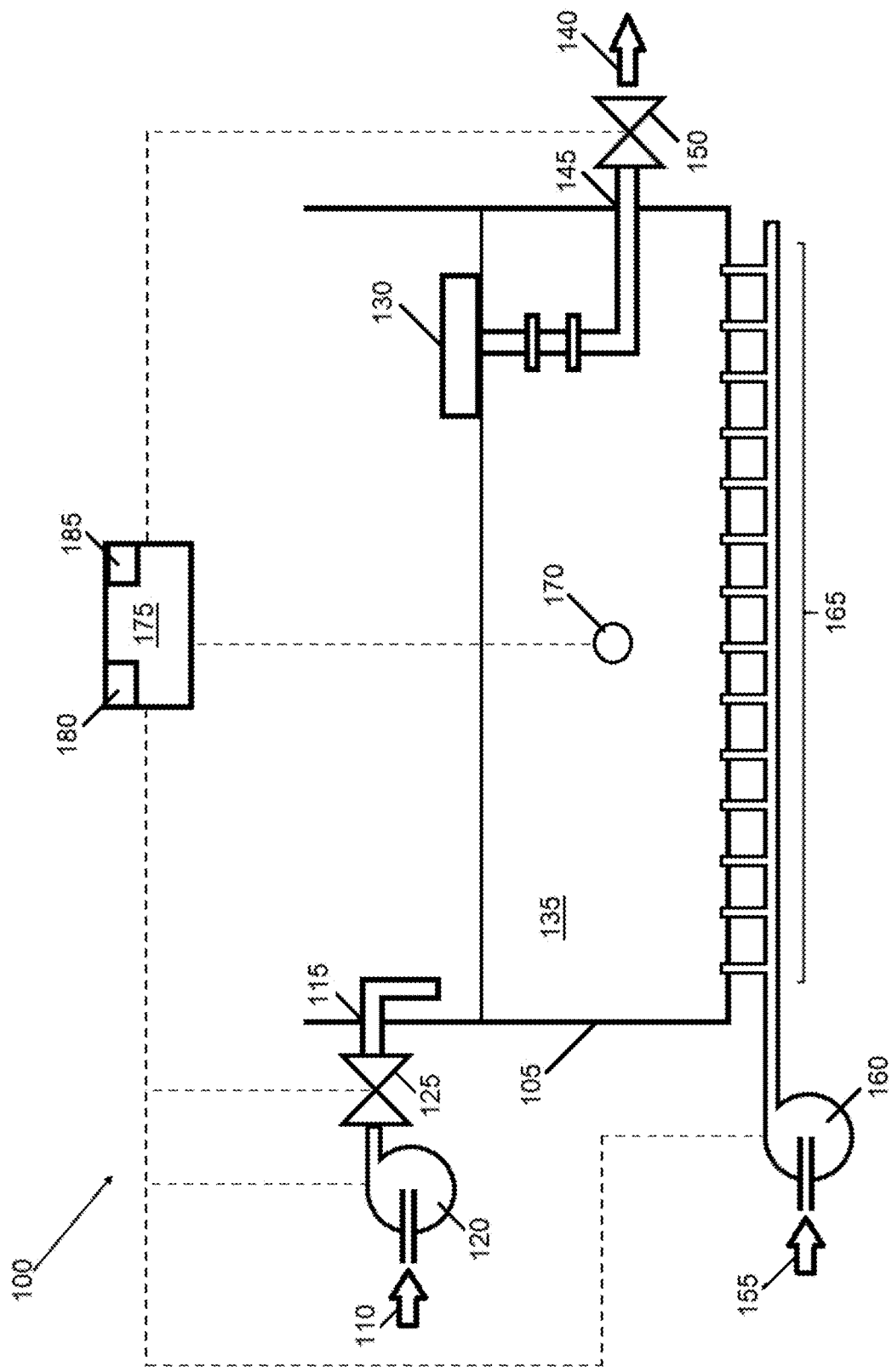
FIG. 5 is a simplified schematic diagram of a sequencing batch reactor.

A simplified diagram of a SBR that may be utilized in various aspects and embodiments disclosed herein is illustrated in FIG. 5, indicated generally at 100. The SBR 100 may include a vessel 105 that receives wastewater 110 from a source of wastewater at an inlet 115 of the vessel 105, for example, via a wastewater pump 120 and control valve 125. A decanter 130, which may include a portion that floats on liquid 135 in the vessel 105 may drain effluent 140 through an outlet 145 of the vessel 105, optionally controlled by an output control valve 150. An oxygen-containing gas 155, for example air, may be provided to the liquid 135 in the vessel 105 via an air pump 160 to a series of aerators 165. Aerators 165 are illustrated as bubbler-type aerators located at the floor of the vessel 105, but it should be appreciated that in other embodiments other forms of aerators, for example, surface aerators may also or additionally be utilized. At least one sensor 170, for example, any one or more of a DO, ORP, or nitrogen (or nitrate or nitrite) concentration sensor may be utilized to provide data to a controller 175 that may utilize such data to control the various sub-systems of the SBR 100, for example, to control the air pump 160 to achieve or maintain a desired level of DO or ORP in the liquid 135 in the vessel 105. The indication of sensor 170 may collectively refer to at least one sensor configured to measure an oxygen demand (COD or BOD) of the liquid 130 (e.g., and ORP or nitrate concentration sensor) and at least one sensor configured to measure a concentration of dissolved oxygen in the liquid 130.

The controller 175 may be implemented using one or more computer systems which may be, for example, a general-purpose computer such as those based on an Intel® CORE™-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC), a programmable logic controller (PLC), or another form of controller intended for water treatment systems.

The computer system can include one or more processors 180 typically connected to one or more memory devices 185, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism may enable communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include the previously described sensor(s) 170 for measuring any one or more parameters of the liquid 135 in the SBR vessel 105. Alternatively, the sensors, and/or other components of the system, such as valves and pumps, may all be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller 175 can include one or more computer storage media 185 such as readable and/or writeable non-volatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does the medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general-purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller 175 can be performed in separate computers, which can be in communication with one another through one or more networks.

Example

A conventional SBR with biological nutrient removal (BNR) requirements uses an anoxic fill as the first step of the treatment cycle followed by aerobic fill and/or react steps. In aspects and embodiments of an SBR disclosed herein, the amount of air is limited so that the oxygen demand exceeds the oxygen transfer rate, resulting in low DO and simultaneous nitrification/denitrification. The last part of the biological treatment cycle operates with a DO around 2 mg/l. This assures complete removal of BOD and ammonia. Applying an aerated-anoxic process to an SBR will reduce the aeration energy by transferring oxygen at a low DO which maximizes the driving force for oxygen transfer, extend the aeration time which reduces the aeration intensity and further decreases the blower size, potentially reduce the effluent total nitrogen (TN) vs. a conventional SBR, and potentially reduce tank volume due to increased aerobic SRT time.

To provide technical proof of these benefits, a comparison between the aeration system size, energy usage, and effluent quality from a conventional Omniflo® SBR (Evoqua Water Technologies LLC, Pittsburgh, PA) and the same system operating with SNDN was demonstrated with a computer model. The modeling software was provided by Hydromantis (GPS-X Ver. 7.01). The computer model assumed the following characteristics of the wastewater to be treated:

| Simulated Wastewater Parameters | | |
|---|---|---|
| Flow rate, MGD | 1 | |
| BOD, mg/l | 250 | 2085 lb/d |
| TSS, mg/l | 250 | 2085 lb/d |
| TKN, mg/l | 40 | 334 lb/d |
| NH$_3$, mg/l | 27 | 225 lb/d |
| Total P, mg/l | 7 | 58 lb/d |
| Temperature, deg. C. | 10 | |

Parameters of the modeled SBR included the following:

| | |
|---|---|
| Number of vessels | 2 |
| Aerobic SRT | 7.7 days |
| SBR volume (total) | 1.27 million gallons (0.633 MG/each vessel) |
| Length/vessel | 77 ft. |
| Width/vessel | 50 ft. |
| Top Water Level (TWL) | 22 ft. |
| Bottom Water Level (BWL) | 17.7 ft |
| MLSS at TWL | 2500 mg/l |
| MLSS at BWL | 3110 mg/l |
| Oxygen Demand | 3170 lb/day |
| Aeration System | Jets, Standard Oxygen Transfer Efficiency - 27.5% |

Standard Cycle Steps/Duration (Total Cycle time=6 hrs, Fill time/reactor=3 hrs)
1. Anoxic Fill—1.5 hrs
2. Aerated Fill—1.5 hrs (DO=2 mg/l)
3. React—1.5 hrs (DO=2 mg/l)
4. Settle—0.75 hrs
5. Decant—0.5 hrs
6. Idle/wasting—0.25 hrs SNDN Cycle Steps/Duration (Total Cycle time=6 hrs, Fill time/reactor=3 hrs)
1 Aerated-Anoxic Step 1—2.25 hrs (DO=0.3 mg/l)
2 Aerated-Anoxic Step 2—1.5 hrs (DO=0.6 mg/l)
3 Aerated-Anoxic Step 3—0.75 hrs (DO=2 mg/l)
4 Settle—0.75 hrs
5 Decant—0.5 hrs
6 Idle/wasting—0.25 hrs

Standard Omniflo® Model Results—Effluent Quality

| Effluent - 24 hr composite | | |
|---|---|---|
| Flow rate, MGD | 1 | |
| BOD, mg/l | 12 | 100 lb/d |
| TSS, mg/l | 14.5 | 121 lb/d |
| TKN, mg/l | 3.0 | 25 lb/d |
| NH$_3$, mg/l | 0.185 | 1.5 lb/d |
| Total N, mg/l | 7.2 | 60 lb/d |
| Total P, mg/l | 0.8 | 6.7 lb/d |
| Temperature, dec. C. | 10 | |

Air flow rate—range 300-700 SCFM

Blower energy requirement—10.6 KW (averaged for 24 hr)

SNDN (Aerated Anoxic) Model Results—Effluent Quality

| Effluent - 24 hr composite | | |
|---|---|---|
| Flow rate, MGD | 1 | |
| BOD, mg/l | 9 | 75 lb/d |
| TSS, mg/l | 14.4 | 120 lb/d |
| TKN, mg/l | 2.9 | 24 lb/d |
| NH$_3$, mg/l | 0.16 | 1.3 lb/d |
| Total N, mg/l | 4.2 | 35 lb/d |
| Total P, mg/l | 0.83 | 6.9 lb/d |
| Temperature, dec. C. | 10 | |

Air Flow Rate—
  Phase 1~320 SCFM
  Phase 2~400 SCFM
  Phase 3~380 SCFM
Blower energy requirement—9.1 KW (averaged for 24 hr) (NOTE—85% of Std Omniflo)

Discussion

Data in the tables above shows that the TSS, BOD, $NH_3$, and P in the effluent from the SNDN SBR system is similar to that produced by the standard Omniflo® SBR. The TN in the effluent from the SND SBR is lower than that in the effluent from the conventional Omniflo® SBR (4.2 mg/l vs 7.2 mg/l) despite there being no pure anoxic period as there is in the conventional Omniflo® SBR.

Figure 6:
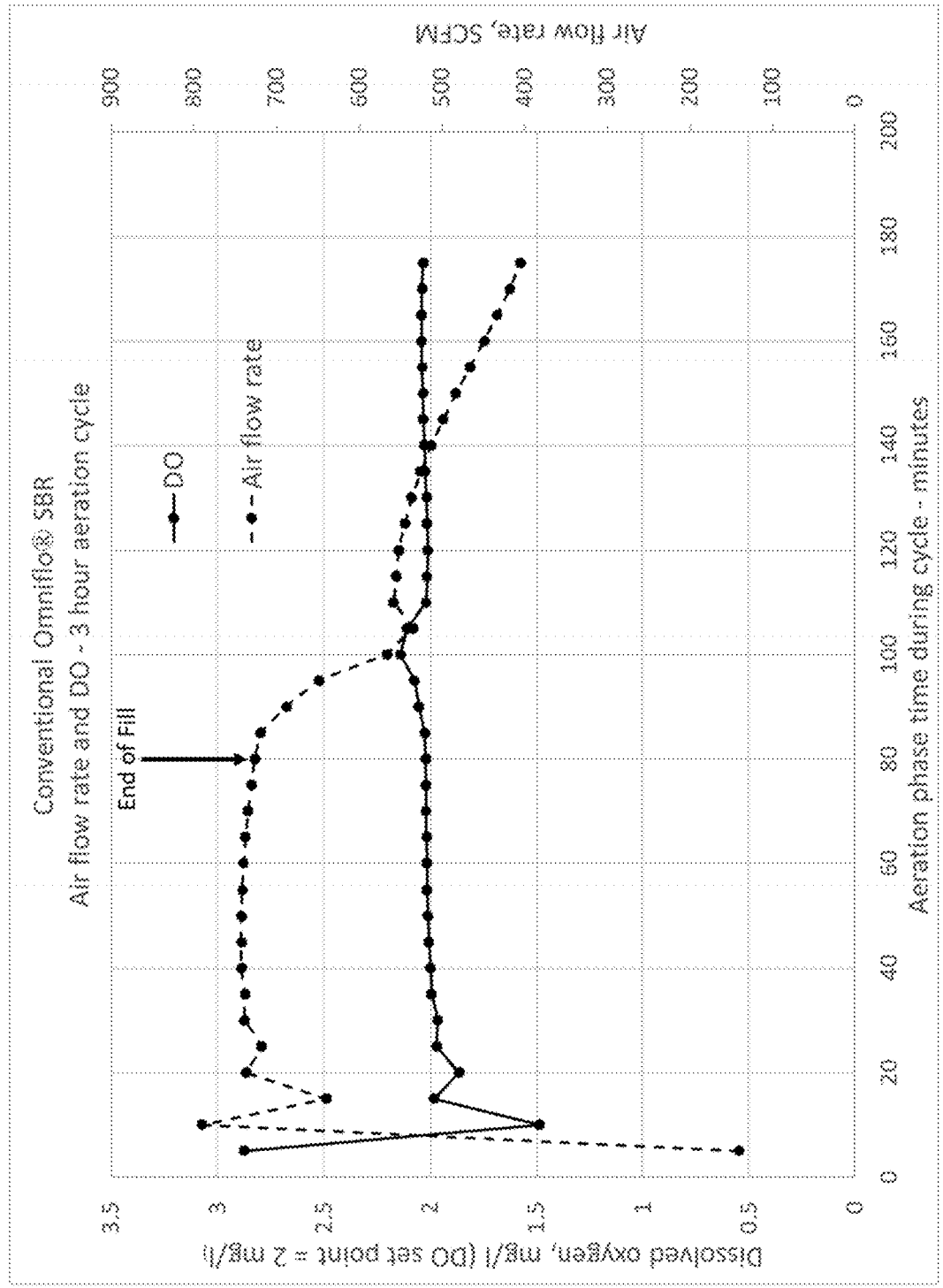
FIG. 6 illustrates results of a computer simulation of operation of a conventional sequencing batch reactor.
Figure 7:
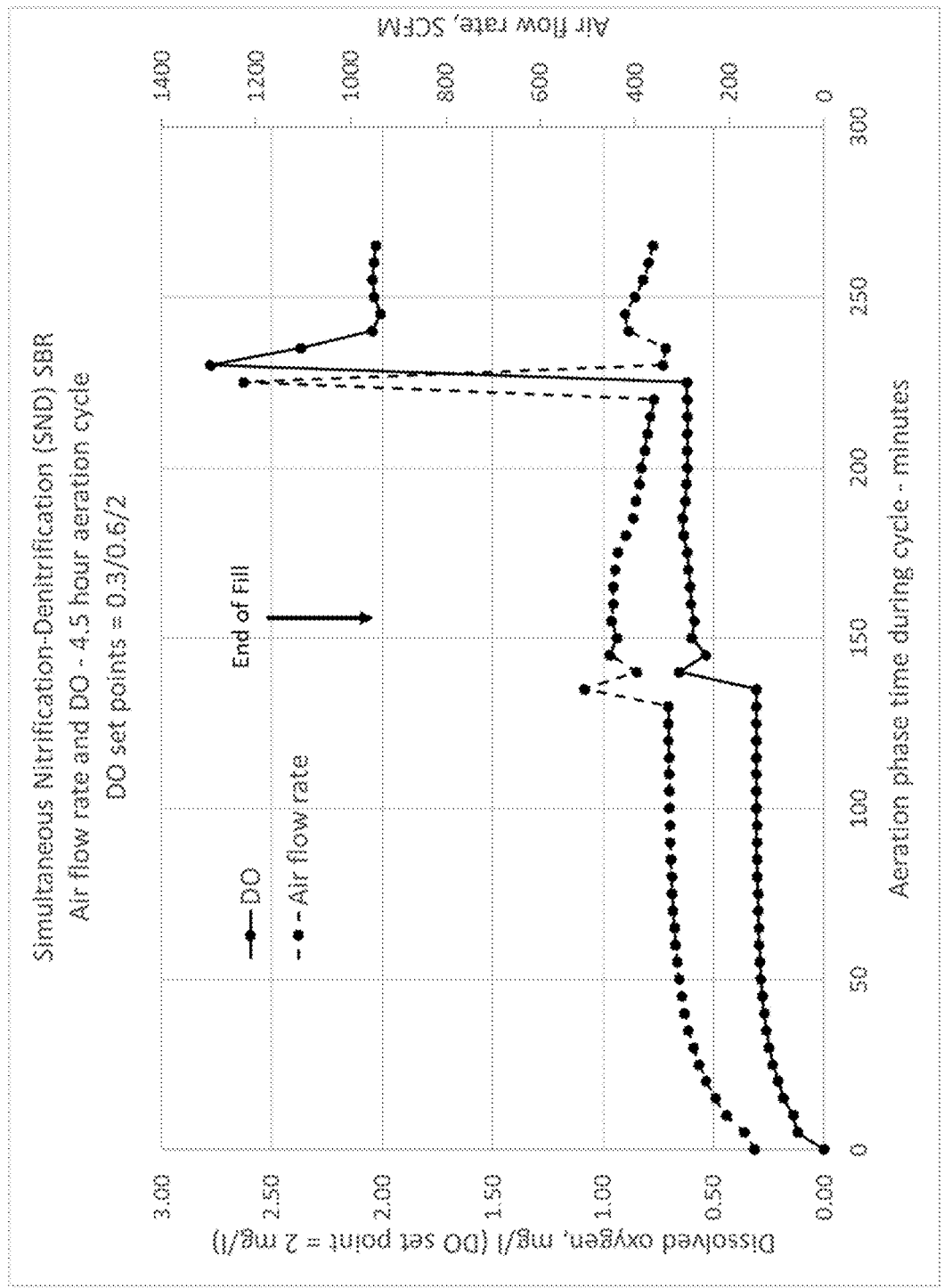
FIG. 7 illustrates results of a computer simulation of a sequencing batch reactor operating in accordance with aspects and embodiments disclosed herein.

The SNDN SBR utilized about 15% less power for aeration than the Omniflo® SBR. Not only is the total power usage reduced with SNDN in the SBR, but the capital equipment cost may be reduced as well due to a lesser need for high capacity aerators. The reduction in air flow (and energy usage) can be seen in the graphs of FIGS. 6 and 7. These graphs show DO and air flow in a typical 6 hour cycle. In the Omniflow® SBR the DO is maintained at close to 2 mg/l for 3 hours (1.5 hr aerated fill followed by 1.5 hours of react). An air flow rate around 700 SCFM is required to provide 2 mg/l in the early part of the cycle during aerated fill. Eventually as the oxygen demand is satisfied the required air flow rate drops to around 300 SCFM. The SNDN SBR operates at a DO of 0.3 mg/l for the first 2.25 hours, then increases to 0.6 mg/l for 1.5 hours, and finally operates at 2 mg/l for the last 0.75 hours. During the first 2.25 hours the air flow rate runs 280-320 SCFM, increasing as the oxygen demand increases during initial fill. The second phase of aeration, with a DO set point of 0.6 mg/l, runs with an air flow rate of around 400 SCFM. The transition from a DO set point of 0.5 mg/l to 2 mg/l causes a momentary spike in the air flow controller, but the air flow drops to around 380 SCFM for the balance of the 0.75 hr time period.

To simulate aerated-anoxic operation a DO controller function in the GPS-X software was used to maintain low DO that results from the low aeration input relative to the oxygen demand. In practice, aeration control using DO as the control signal may be difficult to do because of variability in the DO measurement (this is not a problem in a computer simulation). Oxidation-reduction potential (ORP) may alternatively or additionally be used as a control parameter. Alternative measurements such as nitrate concentration, ammonia concentration, or others could be used as well to monitor and control DO concentration and maintain a low aeration input relative to the oxygen demand in the system during the aerated-anoxic phase of the SBR cycle.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure and are intended to be within the scope of the examples discussed herein. Accordingly, the foregoing description and drawings are by way of example only.

What is claimed is:

1. A method of retrofitting a sequencing batch reactor, the method comprising programming a controller of the sequencing batch reactor to subject wastewater to treatment in the sequencing batch reactor in an aerated anoxic mode in which a concentration of dissolved oxygen in the wastewater in the sequencing batch reactor is maintained at a level insufficient to meet a biological oxygen demand of the wastewater, but sufficient to cause simultaneous nitrification and denitrification reactions to occur in the wastewater, the treatment of the wastewater in the sequencing batch reactor not including introducing sludge from any treatment process downstream of the sequencing batch reactor into the sequencing batch reactor.

2. The method of claim 1, further comprising modifying an aeration system of the sequencing batch reactor to supply a non-binary, variable flow of oxygen-containing gas to the wastewater.

3. The method of claim 1, further comprising programming the controller to operate the sequencing batch reactor in a plurality of treatment regimes within a single operation cycle, each of the plurality of treatment regimes being characterized by a different concentration of dissolved oxygen in the wastewater.

4. The method of claim 3, further comprising programming the controller to operate the sequencing batch reactor in a first treatment regime with the concentration of dissolved oxygen in the wastewater at a first level, operated in a second treatment regime with the concentration of dissolved oxygen in the wastewater at second level higher than the first level performed immediately following operation in the first treatment regime, and to operate in a third treatment regime with the concentration of dissolved oxygen in the wastewater at third level higher than the second level performed immediately following operation in the second treatment regime.

5. The method of claim 4, further comprising programming the controller to operate sequencing batch reactor in the first treatment regime for a first amount of time, in the second treatment regime for a second amount of time less than the first amount of time, and in the third treatment regime for a third period of time less than the second amount of time.

6. The method of claim 5, wherein programming the controller to operate the sequencing batch reactor in the first treatment regime and to operate the sequencing batch reactor in the second treatment regime includes programming the controller to maintain the concentration of dissolved oxygen in the wastewater at a level sufficient to provide for simultaneous nitrification and denitrification to occur in the wastewater in each of the first treatment regime and the second treatment regime.

7. The method of claim 6, wherein programming the controller to operate the sequencing batch reactor in the third treatment regime includes programming the controller to maintain the concentration of dissolved oxygen in the wastewater at a level greater than a concentration at which denitrification occurs in the wastewater during operation in the third treatment regime.

8. The method of claim 7, further comprising programming the controller to: measure the concentration of dissolved oxygen in the wastewater; and maintain the concentration of dissolved oxygen in the wastewater at single predetermined setpoints in each of the plurality of treatment regimes.

9. The method of claim 8, further comprising programming the controller to maintain the concentration of dissolved oxygen in the wastewater at or below an average of 2 mg/L throughout operation in each of the first, second, and third treatment regimes.

10. The method of claim 8, further comprising programming the controller to maintain the concentration of dissolved oxygen in the wastewater at or below an average of between 0.5 mg/L and 0.8 mg/L throughout operation in the second treatment regime.

11. The method of claim 8, further comprising programming the controller to maintain the concentration of dissolved oxygen in the wastewater at or below an average of between 0.2 mg/L and 0.4 mg/L throughout operation in the first treatment regime.

12. The method of claim 11, further comprising programming the controller to maintain the concentration of dissolved oxygen in the wastewater at the predetermined setpoints by modulating flow of an oxygen-containing gas into the wastewater in response to results of comparisons between measured dissolved oxygen concentrations of the wastewater and the predetermined setpoints.

13. The method of claim 5, further comprising programming the controller to perform a settling operation, a decant operation, and an idle operation in the sequencing batch reactor immediately following operating in the third treatment regime.

14. The method of claim 13, further comprising programming the controller to operate the sequencing batch reactor in the first treatment regime during filling of the sequencing batch reactor.

* * * * *